United States Patent
Langhammer et al.

(10) Patent No.: US 9,391,781 B2
(45) Date of Patent: Jul. 12, 2016

(54) SYSTEMS AND METHODS FOR INTERMEDIATE MESSAGE AUTHENTICATION IN A SWITCHED-PATH NETWORK

(71) Applicant: ALTERA CORPORATION, San Jose, CA (US)

(72) Inventors: Martin Langhammer, Salisbury (GB); Shawn David Nicholl, Paradise (CA); Wally Haas, St. John's (CA)

(73) Assignee: Altera Corporation, San Jose, CA (US)

( * ) Notice: Subject to any disclaimer, the term of this patent is extended or adjusted under 35 U.S.C. 154(b) by 145 days.

(21) Appl. No.: 14/137,641

(22) Filed: Dec. 20, 2013

(65) Prior Publication Data
US 2014/0359297 A1 Dec. 4, 2014

Related U.S. Application Data

(60) Provisional application No. 61/830,655, filed on Jun. 4, 2013.

(51) Int. Cl.
| | |
|---|---|
| *H04L 9/32* | (2006.01) |
| *H04B 10/85* | (2013.01) |
| *H04L 29/06* | (2006.01) |
| *H04L 12/723* | (2013.01) |

(52) U.S. Cl.
CPC .............. *H04L 9/3247* (2013.01); *H04B 10/85* (2013.01); *H04L 9/321* (2013.01); *H04L 63/12* (2013.01); *H04L 63/14* (2013.01); *H04L 45/50* (2013.01)

(58) Field of Classification Search
CPC ....... H04L 9/3247; H04L 63/14; H04L 63/12; H04L 9/321; H04L 45/50; H04B 10/85

USPC .......................................................... 726/176
See application file for complete search history.

(56) References Cited

U.S. PATENT DOCUMENTS

| | | | |
|---|---|---|---|
| 2004/0268123 A1 | 12/2004 | Le et al. | |
| 2007/0248224 A1* | 10/2007 | Buskey | H04L 9/3066 380/30 |
| 2014/0006778 A1* | 1/2014 | Dixon | H04L 63/123 713/168 |

FOREIGN PATENT DOCUMENTS

WO 2010003713 A1 1/2010

OTHER PUBLICATIONS

Extended European Search Report mailed Dec. 1, 2014.
S. Kent; "Network Working Group" Jan. 1, 2005. Retrieved from the Internet: URL:http://tools.ietf.org/pdf/rfc4301.pdf.; pp. 1-84 & pp. 85-101.

(Continued)

*Primary Examiner* — Mohammad W Reza
(74) *Attorney, Agent, or Firm* — Fletcher Yoder, P.C.

(57) ABSTRACT

Systems, methods, and devices are provided for intermediate authentication of a message transmitted through a switched-path network, such as an optical transport network (OTN). In one method, a message transmitted through communication nodes of a switched-path network may be authenticated, at least partially, by authentication logic of one or more of the communication nodes. The one or more communication nodes may identify whether a prior communication node has tampered with or corrupted the message or may generate an authentication tag to enable an authentication authority to authenticate the message.

34 Claims, 9 Drawing Sheets

(56) References Cited

OTHER PUBLICATIONS

S. Kent: "Network Working Group" Jan. 1, 2005. Retrieved from the Internet: URL:http://tools.ietf.org/pdf/rfc4302.pdf.; pp. 1-34.

Yuanhe, Dong: Research and Design of Safe Campus All-in-One-Card Network Based on MPLS VPN, 2012 IEEE International Conference on Cyber Technology in Automation, Control, and Intelligent System (CYBER) 3 pp. 908-910.

* cited by examiner

SYSTEMS AND METHODS FOR INTERMEDIATE MESSAGE AUTHENTICATION IN A SWITCHED-PATH NETWORK

CROSS-REFERENCE TO RELATED APPLICATIONS

This application claims the benefit of and priority to U.S. Provisional Application No. 61/830,655, titled "Network Attack Detection and Isolation" and filed Jun. 4, 2013, which is incorporated by reference herein in its entirety for all purposes.

BACKGROUND

This disclosure relates to detecting message tampering by a communication node in a switched-path network.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

When a message is sent over a network, such as the Internet, the message may pass through one or more large telecommunications provider networks. When a particular provider network receives the message as it travels from a sender to a receiver, the provider network may transmit the message over a switched path through several communication nodes controlled by that provider network. The switched-path network of the telecommunications provider may predefine the path through communication nodes that the message will take on its way through the telecommunications provider network. One example of such a switched-path network is an optical transport network (OTN).

Although the sender may employ end-to-end encryption and authentication, individual communication nodes or even entire telecommunications provider networks could attempt to tamper with the message or otherwise behave unreliably. When the message is tampered with, the ultimate receiver of the message may use the end-to-end authentication to identify that the message is not authentic and, as such, that the message has been tampered with somewhere along the path between the sender and the receiver. Although end-to-end authentication can enable the receiver to identify that the message is not authentic, the source of the message tampering may be unknown. Indeed, in some circumstances, neither the sender, nor the receiver, nor the telecommunications provider may be able to identify a particular untrustworthy or unreliable communication node.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

Embodiments of the disclosure relate to systems, methods, and devices for authenticating a message transmitted through a switched-path network (e.g., an optical transport network (OTN)). By way of example, a message transmitted through communication nodes of a switched-path network may be authenticated, at least partially, by authentication logic of one or more of the communication nodes. By way of example, the communication nodes may identify whether a prior one of the communication nodes has tampered with the message. Additionally or alternatively, an authentication authority may authenticate the message based on an authentication tag generated by the one or more communication nodes.

Various refinements of the features noted above may be made in relation to various aspects of the present disclosure. Further features may also be incorporated in these various aspects as well. These refinements and additional features may be made individually or in any combination. For instance, various features discussed below in relation to one or more of the illustrated embodiments may be incorporated into any of the above-described aspects of the present invention alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which.

DETAILED DESCRIPTION OF SPECIFIC EMBODIMENTS

Figure 1:
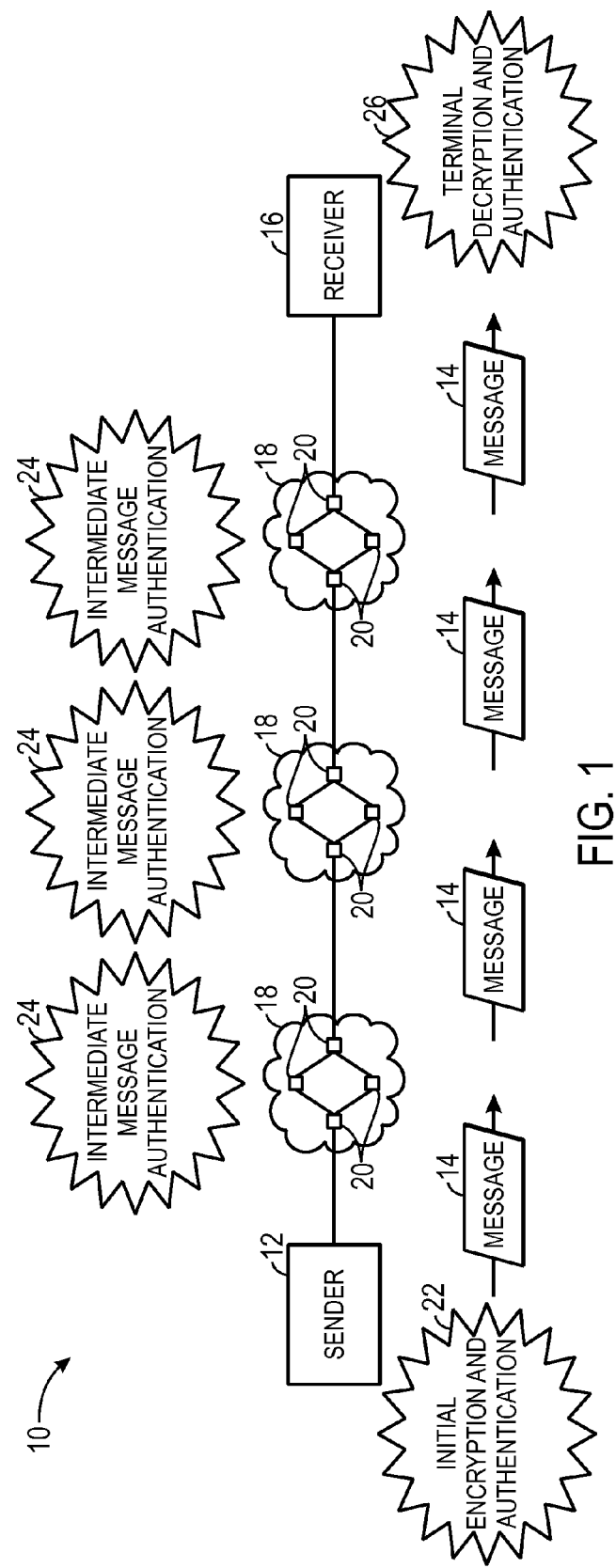
FIG. 1 is a block diagram of a system for detecting message tampering through intermediate provider networks when a message is sent from a sender to a receiver, in accordance with an embodiment.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of this disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of this disclosure are not intended to be interpreted as excluding the existence of additional embodiments that also incorporate the recited features.

A message sent through a network (e.g., the Internet), by a sender, may pass through a number of communication nodes to reach a receiver. To detect troublesome communication nodes that could tamper with the message along the way, this disclosure describes various systems, methods, and devices to authenticate the message as it passes through communication nodes of intermediate (e.g., telecommunications) provider networks. When the message traverses an intermediate provider network, it may do so via a switched-path network. One example of a switched-path network is an optical transport network (OTN). In a switched-path network, the path the message will take may be defined or predefined when the message is initially received in the intermediate provider network. It is believed that predefining the network path of the message may enable a bad actor to tamper with the message by compromising a communication node of the switched-path network. To prevent tampering or corruption by troublesome communication nodes in the predefined message path, the intermediate provider network and/or an authentication authority may authenticate the message as it passes through the communication nodes. This intermediate message authentication may take place every time the message enters a new communication node or through some form of sampling (e.g., randomly sampling or sampling according to any suitable statistical model). By at least occasionally authenticating messages, troublesome communication node(s) may be identified. The intermediate provider network and/or the authentication authority may thereafter take action to ameliorate the effect of the troublesome nodes (e.g., cause network management software and/or a network control plane, which may run on one or more of the communication nodes or may be apart from the communication nodes, to route around the troublesome communication node(s) or identify a possible bad actor that has compromised the communication node).

In one example, the sender may use end-to-end authentication to enable both the intermediate provider networks and the end receiver to authenticate the message. For instance, the sender may use a first authentication key to generate an authentication tag, which may also be referred to as a digital signature, by processing the data of the message according to the first authentication key. The intermediate provider networks may also use the first authentication key to determine whether the message has been tampered with. By authenticating the message at various communication nodes through the intermediate provider network, the intermediate provider network may identify that a previous communication node has tampered with or otherwise has corrupted the message.

In another example, the sender may use end-to-end authentication to enable the receiver to authenticate the message and use other authentication to enable the intermediate provider networks to authenticate the message. For instance, the sender may use a first authentication key to generate a first authentication tag, which may also be referred to as a digital signature, by processing the data of the message according to the first authentication key. The sender may also use a second authentication key to generate a second authentication key to generate a second authentication key. The intermediate provider networks may use the second authentication key to determine whether the message has been tampered with. As in the previous example above, by authenticating the message at various communication nodes through the intermediate provider network, the intermediate provider network may identify that a previous communication node has tampered with or otherwise has corrupted the message.

In another example, a separate authentication authority may identify troublesome communication nodes. For instance, each intermediate provider network and/or communication nodes of each intermediate provider network may authenticate the message using a different authentication key. The intermediate provider networks may generate authentication tags using these authentication keys and provide the authentication tags to the authentication authority. The authentication authority may authenticate the message using these authentication keys. When the authentication authority identifies that a message is not authentic, the authentication authority may identify which communication node and/or intermediate provider network has been compromised and/or is otherwise troublesome. The authentication authority may instruct the sender, receiver, and/or intermediate provider network that a troublesome communication node has been detected to enable remedial action.

With this in mind, FIG. 1 is a block diagram of a message transmission system 10 that can detect and/or mitigate message tampering. A sender 12 may transmit a message 14 to a receiver 16 (e.g., over the Internet) by way of intermediate provider network(s) 18. When the message 14 reaches each intermediate provider network 18, the message may be routed through a number of communication nodes 20. In general, the message 14 may be routed through the communication nodes 20 in a switched path that is predefined at the outset of traversing the intermediate provider network 18. In certain examples, the intermediate provider networks 18 may be networks controlled by large telecommunications entities and, in some embodiments, the networks may employ multi-protocol label switching (MPLS) networks. By way of example, one or more of the intermediate provider networks 18 may be optical transport networks (OTNs) that route the message 14 over a label-switched path through the communication nodes 20.

The sender 12 may initially encrypt and authenticate (e.g., digitally sign) 22 the message 14 before sending the message 14 to the intermediate provider networks 18. The intermediate provider networks 18 may perform intermediate message authentication 24 to authenticate the message 14 and verify that the message 14 has not been tampered with. The intermediate message authentication 24 may take place in a variety of ways—for instance, using a common end-to-end authentication key, using additional authentication keys, and/or using different authentication keys and communication with an authentication authority. Various ways of performing the intermediate message authentication 24 will be discussed further below. The intermediate message authentication 24 may be used to identify whether the message 14 has been tampered with as it passes through the communication nodes 20 of the intermediate provider networks 18. The receiver 16 may perform a terminal decryption and authentication 26 of the message 14 using the end-to-end encryption and authentication scheme. As such, the receiver 16 may read the data provided in the message 14 while also identifying whether the message 14 has been tampered with.

Figure 2:
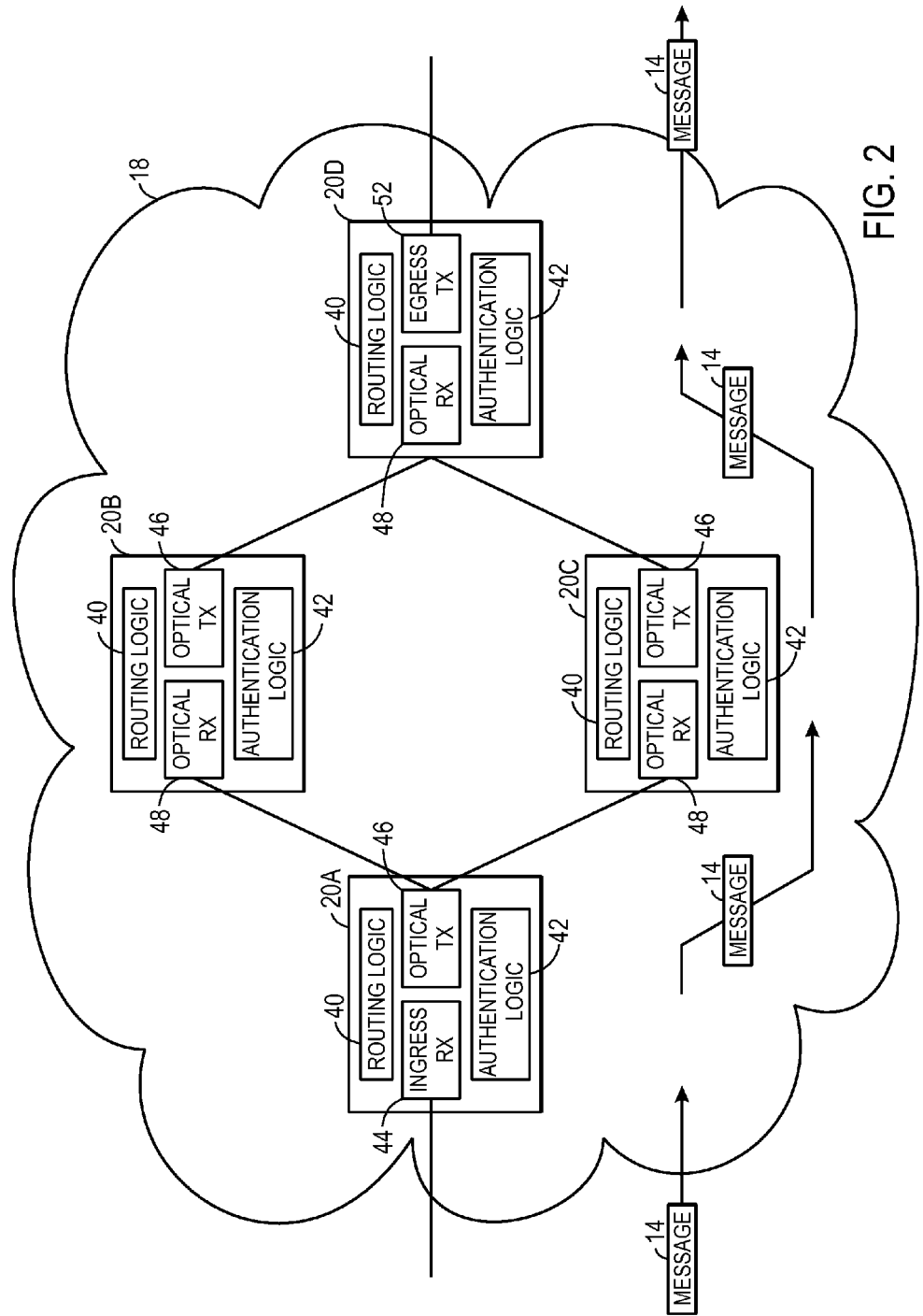
FIG. 2 is a plot diagram of an optical transport network (OTN) of an intermediate provider network that may employ intermediate authentication to identify troublesome communication nodes, in accordance with an embodiment.

When the message 14 enters a particular intermediate provider network 18, the message 14 may be authenticated by the communication nodes 20. A particular intermediate provider network 18 may include a number of communication nodes 20 that may both route the message 14 through the intermediate provider network 18 and authenticate the message 14. For instance, as shown in FIG. 2, an intermediate provider network 18 may include several communication nodes 20, here shown as 20A, 20B, 20C, and 20D. The communication nodes 20A, 20B, 20C, and 20D include routing logic 40 to route the message 14 through the intermediate provider network 18 and authentication logic 42 that may authenticate the message 14. The routing logic 40 and the authentication logic 42 may be implemented in hardware logic (e.g., an application-specific integrated circuit (ASIC) and/or a programmable logic device (PLD) such as a field programmable gate array (FPGA) from Altera Corporation) and/or using software instructions executed by a microprocessor. Such instructions may be stored on any suitable article of manufacture, such as memory and/or storage in the form of read-only memory (ROM), random access memory (RAM), a hard drive, flash memory, and/or an optical storage medium.

The communication node 20A may represent an ingress communication node that includes an ingress receiver (RX) 44 by which to receive the message 14 from an electronic device external to the intermediate provider network 18 (e.g., the sender 12 or another communication node 20 from a different intermediate provider network 18). In some embodiments, the communication node 20A may implement multiprotocol label switching (MPLS). As such, the communication node 20A may operate as an ingress label switching router (LSR) that may determine the switched path through which the message 14 will travel in the intermediate provider network 18. In other embodiments, the communication node 20A may perform any other suitable routing through the intermediate provider network 18.

In the example of FIG. 2, the intermediate provider network 18 is an optical transport network (OTN). As such, the node 20A may include an optical transmitter (TX) 46 that may connect to one or more optical receivers (RX) 48 located in other communication nodes 20 (e.g., communication node 20B and communication node 20C). Likewise, these nodes may also include optical transmitters (TX) 46, which themselves may be connected to other communication nodes 20 of the intermediate provider network 18 (e.g., communication node 20D). The communication node 20D may operate as an egress node. For instance, when the intermediate provider network 18 operates using multiprotocol label switching (MPLS) routing, the communication node 20D may operate as an egress label switching router (LSR). The communication node 20D may include an egress transmitter (TX) 52 with a connection to an electronic device external to the intermediate provider network 18 (e.g., the receiver 14 or another intermediate provider network 18).

In the example of FIG. 2, the message 14 traverses a switched path through communication nodes 20A, 20C, and 20D. At each communication node 20, or some subset of the communication nodes 20, in the switched path traversed by the message 14, the authentication logic 42 of the communication node 20 may perform the intermediate authentication 24 discussed above with reference to FIG. 1. In this way, the authentication logic 42 may identify whether the message 14 has been tampered with by a prior communication node 20. For instance, the communication node 20D may authenticate the message 14 using its corresponding authentication logic 42. If the authentication logic 42 detects that the message 14 is not authentic, it may be assumed that the message 14 was corrupted or tampered with prior to arriving at the communication node 20D. This may suggest, for example, that the communication node 20C has been compromised, and is tampering with the data. The intermediate provider network 18 thus may route around the communication node 20C, taking the message 14 through the communication 20B instead, and/or take other remedial action.

As noted above, the message 14 may be authenticated along the path through the intermediate provider network(s) 18 in a variety of ways. A system 60 shown in FIG. 3, which represents one example of the system 10 of FIG. 1, allows the intermediate provider networks 18 to authenticate the message 14 using the same end-to-end authentication scheme employed by the sender 12 and the receiver 16. In the system 60 of FIG. 3, the sender 12 holds an end-to-end encryption key E 62 and an authentication key A1 64. The receiver 16 holds a corresponding encryption key E 62 and a corresponding authentication keys A1 64. Each of the intermediate provider networks 18 also holds the authentication keys A1 64. In this configuration, the authentication scheme may be referred to as a symmetric authentication scheme (e.g., Advanced Encryption Standard (AES)) that may be less computationally expensive than asymmetric authentication schemes (e.g., public-private authentication). In other examples, however, the authentication scheme may be asymmetric and use distinct public-private keys. Moreover, it should be understood that the encryption keys E 62 and the authentication keys A1 64 may be changed occasionally over time.

Figure 3:
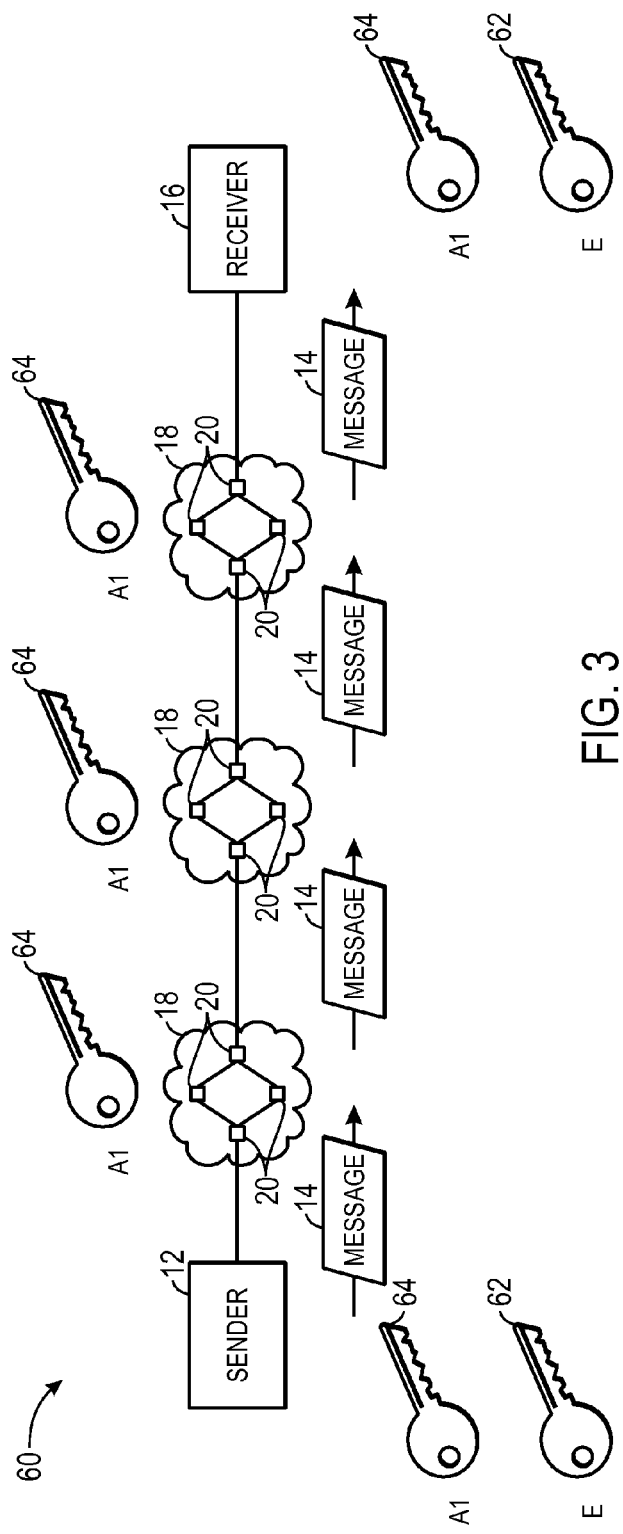
FIG. 3 is a block diagram illustrating a system for authenticating the message between the sender and the receiver through communication nodes of the intermediate provider networks, in accordance with an embodiment.
Figure 4:
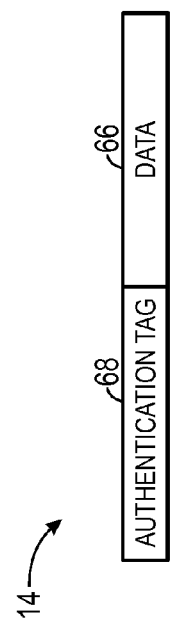
FIG. 4 is a schematic diagram of the message sent through the system of FIG. 3, in accordance with an embodiment.

In the example of FIG. 3, when the sender 12 encrypts and authenticates the message 14, the message 14 generally may have a format illustrated in FIG. 4. The message 14 may include, for example, at least some data 66 and a corresponding authentication tag 68. Although not shown in FIG. 4, the message 14 may include many other components, which may be used for routing and encryption, among other things. The authentication tag 68, which may also be referred to as a digital signature, is generated when the sender 12 processes the data 30 using an authentication key. The authentication tag 68 is specific to the data 30 and the particular authentication key. Thus, the intermediate provider networks 18 and/or the receiver 16, given a corresponding authentication key, may determine whether the authentication tag 68 does, in fact, properly authenticate the message 14. As should be appreciated, the data 30 used to generate the authentication tag 68 may represent data that previously has been encrypted by the encryption key E 62.

Figure 5:
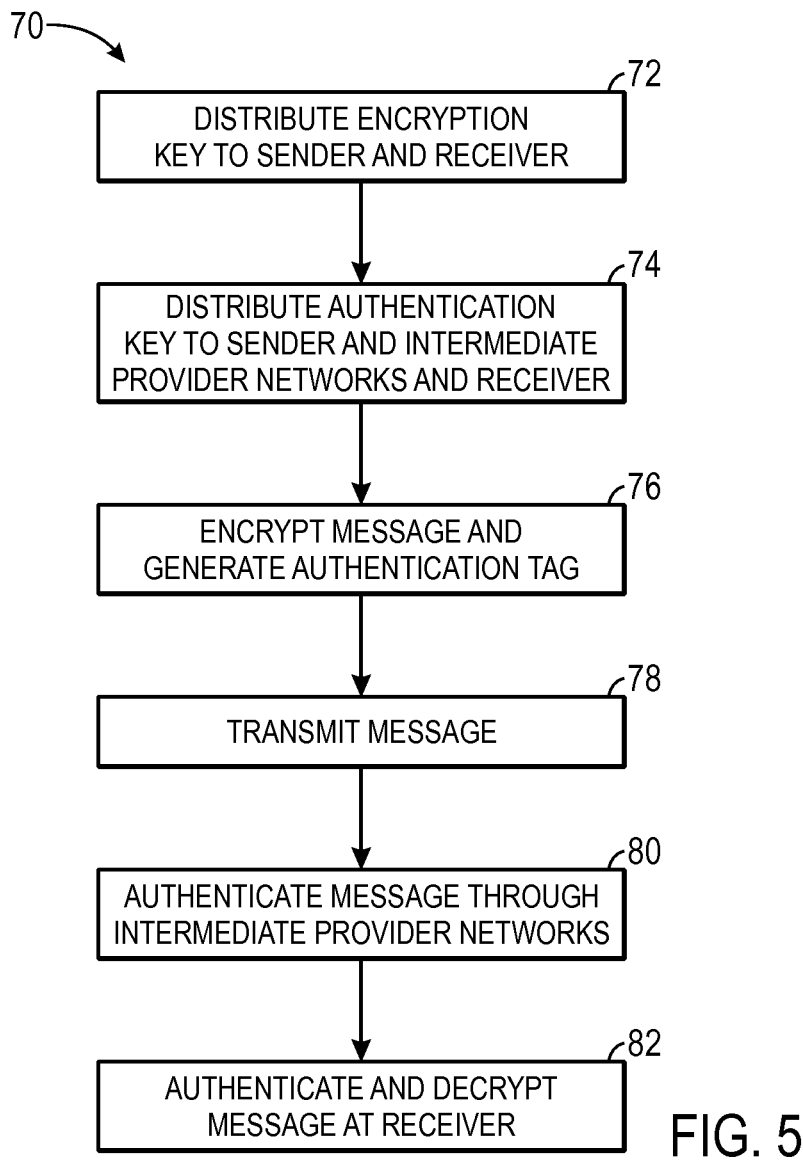
FIG. 5 is a flowchart of a method for detecting troublesome communication nodes using the system shown in FIG. 3, in accordance with an embodiment.

Still considering the example of FIG. 3, as illustrated in a flowchart 70 of FIG. 5, the encryption key E 62 may be distributed to the sender 12 and receiver 16, respectively, in any suitable manner (block 72). The encryption key E 62 may be distributed, for example, through any suitable form of public-private key encryption (e.g., Diffie-Hellman) or any other suitable key distribution techniques. For instance, the encryption key E 62 may be propagated between the sender 12 and the receiver 16 by sending the encryption key E 62 through a separate message from the sender 12 to the receiver 16 that is encrypted using a public-private key authentication scheme. Similarly, the authentication keys A1 64 may be distributed to the sender 12 and the intermediate provider network(s) 18 and the receiver 16 (block 74). The authentication keys A1 64 also may be distributed, for example, through any suitable form of public-private key encryption or any other suitable key distribution techniques. When the encryption key E 62 and the authentication keys A1 64 have been distributed, the sender 12 may encrypt the message 14 using the encryption key E 62 and digitally sign the message 14 using the authentication keys A1 64 (block 76) before transmitting the message 14 out toward the receiver 16 (block 78).

As the message 14 is travelling through the communication nodes 20 of the intermediate provider network(s) 18, the various communication nodes 20 may authenticate the message 14 (block 80). For example, each communication node 20 may perform some form of authentication using the authentication logic 42 and the authentication keys A1 64 to identify whether a prior communication node 20 has tampered with the message 14. That is, if a communication node 20 identifies that the message 14 is not authentic, the communication node 20 may indicate that a prior communication node 20 has been compromised and the intermediate provider network 18 take some form of remedial action (e.g., route around the troublesome communication node 20). In another example, all or a subset of communication nodes 20 may periodically, randomly, or otherwise statistically sample messages 14 passing through the communication nodes 20 to authenticate the messages 14. Doing so may consume fewer resources than authenticating every message 14 at every communication node 20. When the message 14 has finished traversing the intermediate provider networks 18 and arrives at the receiver 16, the receiver 16 may decrypt the message 14 using the encryption key E 62 and authenticate the message using the authentication keys A1 64 (block 82).

Figure 6:
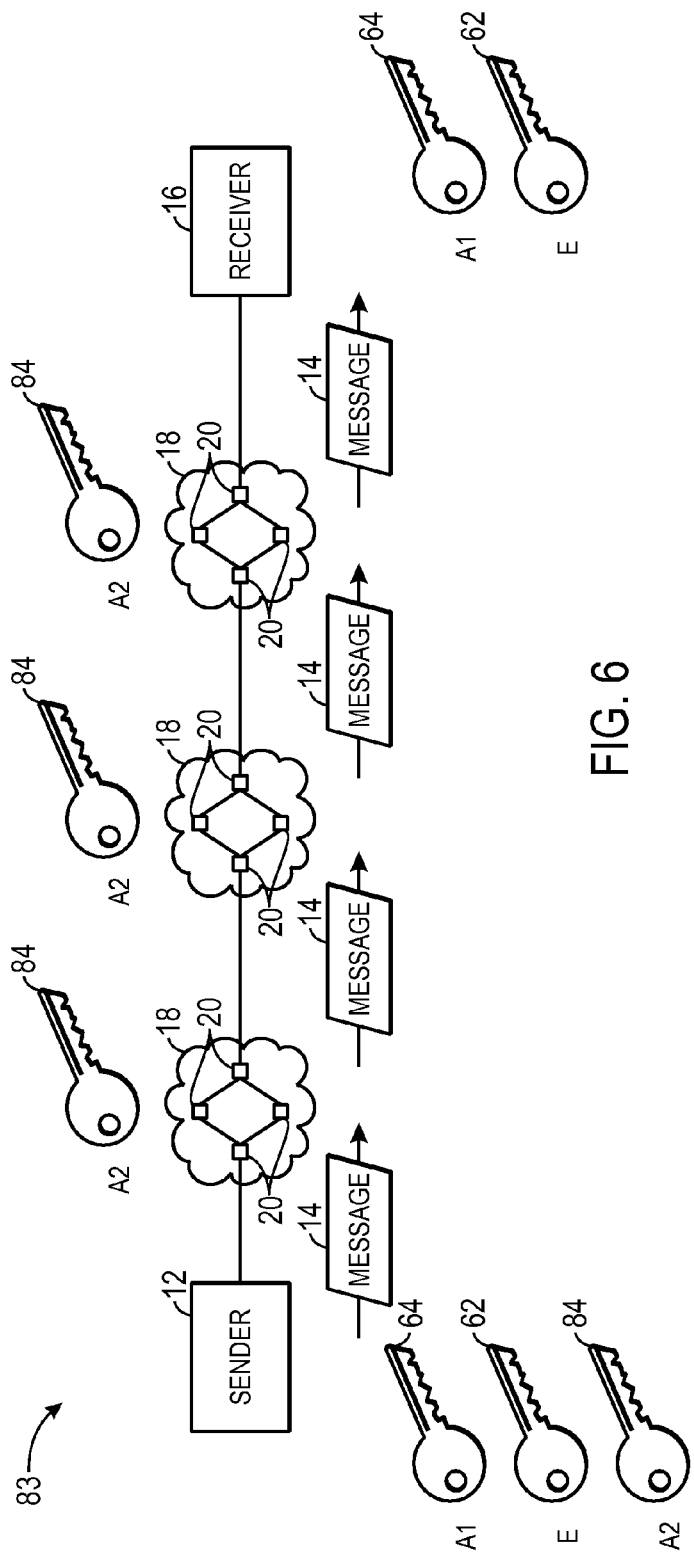
FIG. 6 is a block diagram illustrating a system for authenticating the message between the sender and the receiver through communication nodes of the intermediate provider networks, in accordance with an embodiment.

Additionally or alternatively, as shown in a system 83 of FIG. 6, the sender 12 may apply an additional digital signature using a second authentication keys A2 84. Thus, the sender 12 may hold the encryption key E 62, the authentication keys A1 64, and the authentication keys A2 84. The receiver 16 holds the encryption key E 62 and the authentication keys A1 64, while the intermediate provider networks 18 hold the second authentication keys A2 84.

Figure 7:
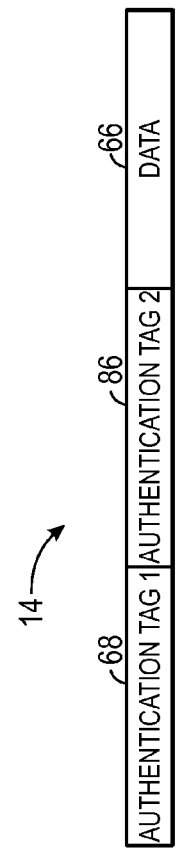
FIG. 7 is a schematic diagram of the message sent through the system of FIG. 6, in accordance with an embodiment.

When the sender 12 encrypts and authenticates the message 14, two authentication tags may be generated, as shown in FIG. 7. Namely, the message 14 may include the data 66, the first authentication tag 68 generated using the authentication key A1 64, as well as an additional second authentication tag 86 generated using the authentication keys A2 84. It should be appreciated that the message 14 may include other components used in routing and/or encrypting the message 14.

Figure 8:
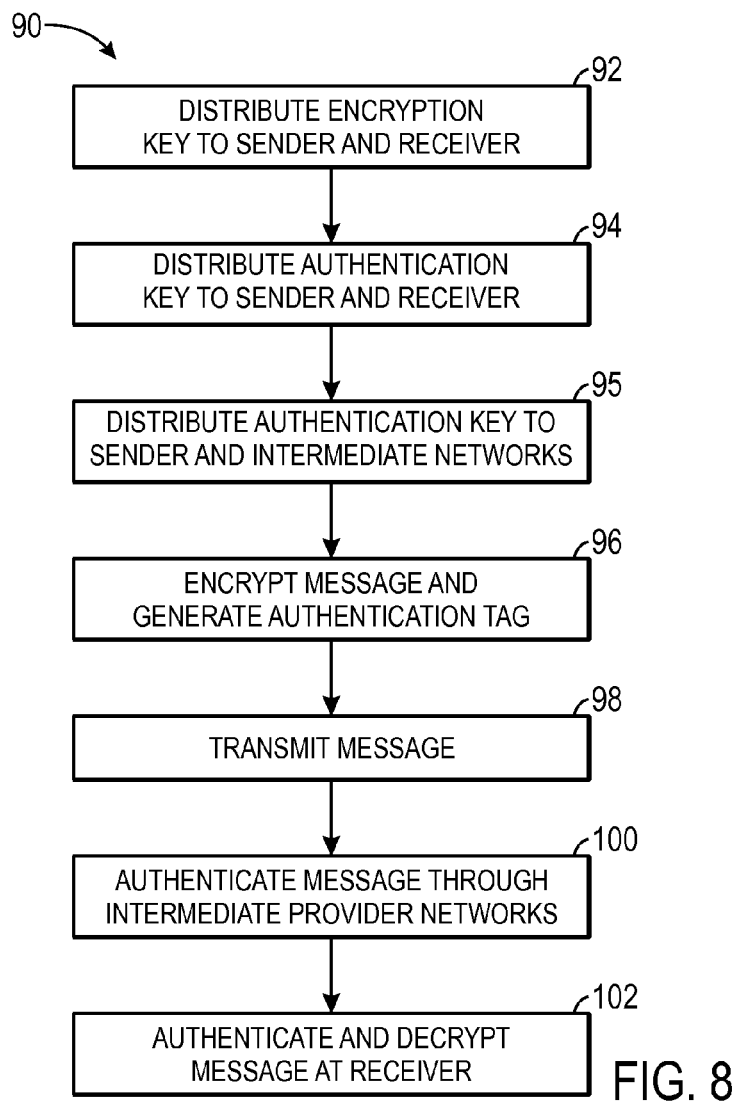
FIG. 8 is a flowchart of a method for detecting troublesome communication nodes using the system shown in FIG. 6, in accordance with an embodiment.

In an example shown in a flowchart 90 of FIG. 8, the encryption key E 62 may be distributed to the sender 12 and receiver 16, respectively, in any suitable manner (block 92). The encryption key E 62 may be distributed, for example, through any suitable form of public-private key encryption (e.g., Diffie-Hellman) or any other suitable key distribution techniques. For instance, the encryption key E 62 may be propagated between the sender 12 and the receiver 16 by sending the encryption key E 62 through a separate message from the sender 12 to the receiver 16 that is encrypted using a public-private key authentication scheme. Similarly, the authentication keys A1 64 may be distributed to the sender 12 and the receiver 16 (block 94). The authentication keys A1 64 also may be distributed, for example, through any suitable form of public-private key encryption or any other suitable key distribution techniques. The authentication key A2 84 may be similarly distributed using any suitable distribution technique to the sender 12 and the intermediate provider networks 18 (block 95). For example, the authentication keys A2 84 may be propagated between the sender 12 and the receiver 16 by sending the authentication keys A2 84 through a separate message, encrypted using a public-private key authentication scheme, from the sender 12 to the intermediate provider networks 18. When the encryption key E 62, the authentication keys A1 64, and the authentication keys A2 84 have been distributed, the sender 12 may encrypt the message 14 using the encryption key E 62 and digitally sign the message 14 using the authentication keys A1 64 (block 96) before transmitting the message 14 out toward the receiver 16 (block 98).

As the message 14 is travelling through the communication nodes 20 of the intermediate provider network(s) 18, the various communication nodes 20 may authenticate the message 14 (block 100). For example, each communication node 20 may perform some form of authentication using the authentication logic 42 and the authentication keys A2 84 to identify whether a prior communication node 20 has tampered with the message 14. That is, if a communication node 20 identifies that the message 14 is not authentic based on the second authentication tag 86 and the second authentication keys A2 84, the communication node 20 may indicate that a prior communication node 20 has been compromised and the intermediate provider network 18 take some form of remedial action (e.g., route around the troublesome communication node 20). In another example, all or a subset of communication nodes 20 may periodically, randomly, or otherwise statistically sample messages 14 passing through the communication nodes 20 to authenticate the messages 14. Doing so may consume fewer resources than authenticating every message 14 at every communication node 20. When the message 14 has finished traversing the intermediate provider networks 18 and arrives at the receiver 16, the receiver 16 may decrypt the message 14 using the encryption key E 62 and authenticate the message using the authentication keys A1 64 (block 102).

Figure 9:
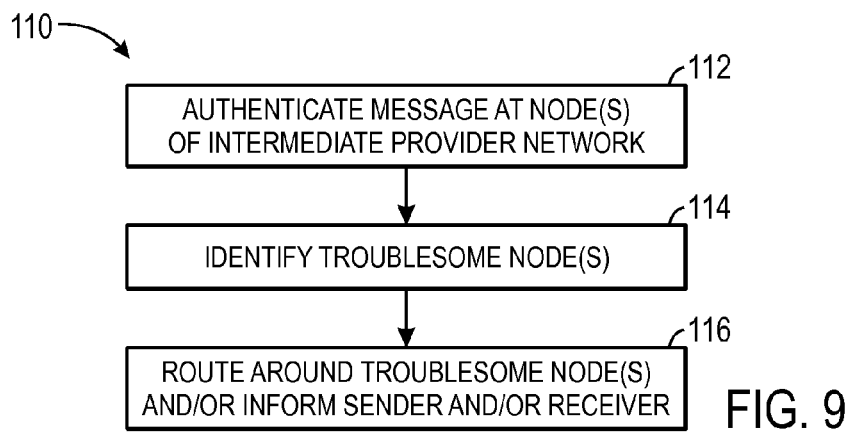
FIG. 9 is a flowchart of a method for responding to the detection of troublesome communication nodes, in accordance with an embodiment.

In other words, as described by a flowchart 110 of FIG. 9, the message 14 may be authenticated at each communication node 20, some subset of the communication nodes 20, and/or according to some statistical sampling scheme of the communication nodes 20 (block 112). Occasionally, the message 14 may be identified as not authentic, which may enable the intermediate provider network 18 to identify one or more troublesome communication node(s) 20 as having tampered with or otherwise corrupted the message 14 (block 114). The intermediate provider network 18 may route around the troublesome node(s) 20 and/or may inform the sender 12 and/or receiver 16.

Figure 10:
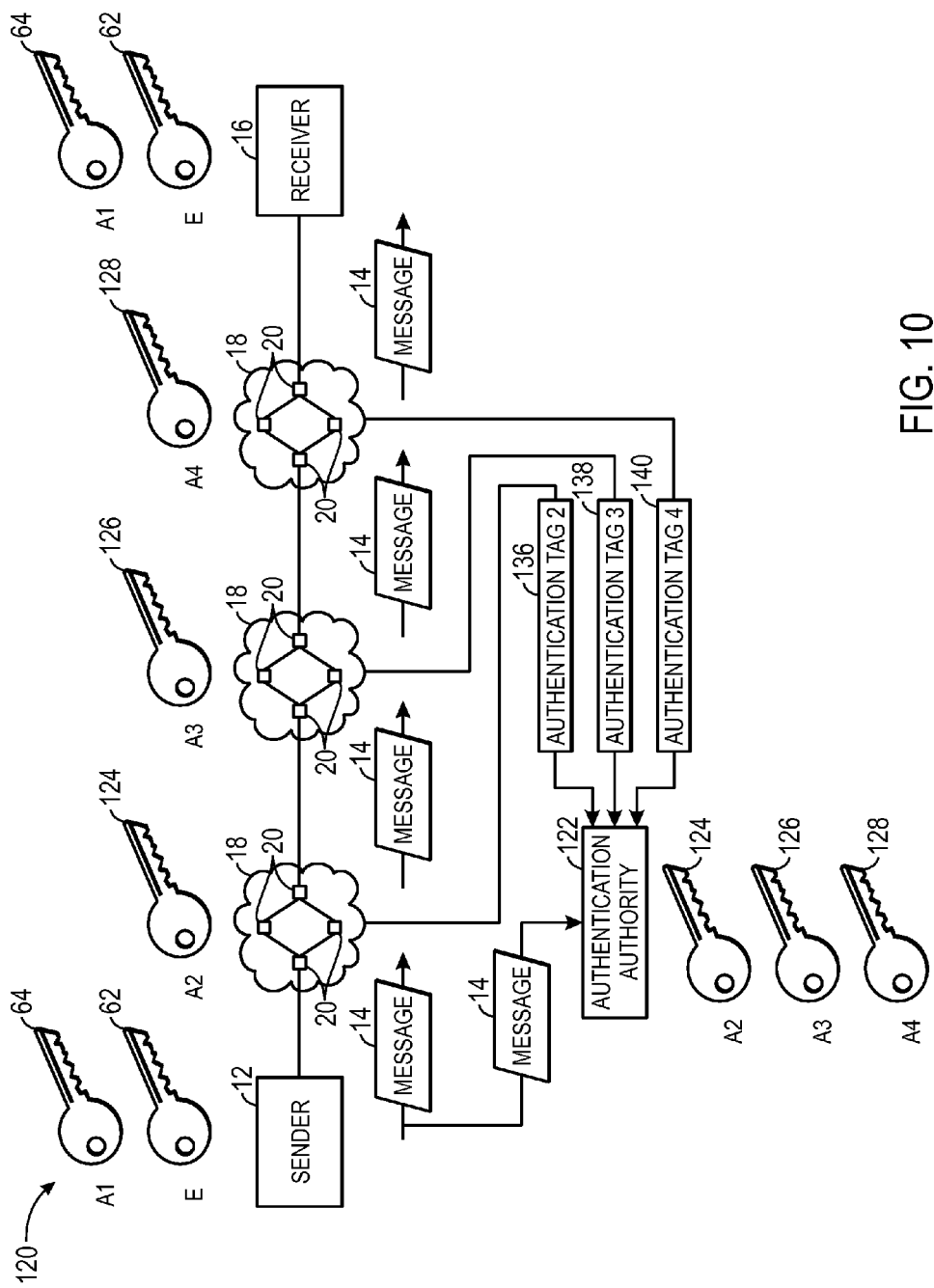
FIG. 10 is a block diagram illustrating another system for authenticating the message between the sender and the receiver through communication nodes of the intermediate provider networks, in accordance with an embodiment.

A system 120 of FIG. 10 represents another example of the message authentication system 10 of FIG. 1. In the system 120 of FIG. 10, as in the systems 60 of FIGS. 3 and 83 of FIG. 6, the sender 12 holds the encryption key E 62 and the authentication keys A1 64. The receiver 16 holds the corresponding encryption key E 62 and the corresponding authentication keys A1 64. An authentication authority 122 holds an authentication keys A2 124, an authentication key A3 126, and an authentication key A4 128. The intermediate provider networks 18 hold corresponding authentication key A2 124, authentication key A3 126, and authentication key A4 128. The communication nodes 20 of the intermediate provider networks 18 may use these authentication keys A2 124, A3 128, and A4 130, respectively, to generate authentication tag 2 136, authentication tag 3 138, and authentication tag 4 140. The authentication authority 122 may be able to independently verify the authenticity of the message 14 and/or issue guidance to the intermediate provider networks 18 using the authentication tags 136, 138, and 140, the message 14, and the authentication keys A2 124, A3 128, and A4 130.

Moreover, it should be understood that the system 120 of FIG. 10 is not mutually exclusive of the system 60 of FIG. 3 or the system 83 of FIG. 6. That is, in some embodiments, the intermediate provider networks 18 may authenticate the message 14 using the end-to-end authentication keys A1 64 while the authentication authority 122 may independently authenticate the message 14 based on the authentication keys A2 124, A3 126, and A4 128. Also, it may be appreciated that the system 120 of FIG. 10 may pass messages 14 having data 66 and an authentication tag 68, as illustrated in FIG. 4 and discussed further above. In this way, authentication keys other than the end-to-end authentication keys A1 64 may be used to authenticate the message 14 as it passes through the intermediate provider networks 18, which may increase the security of the end-to-end authentication keys A1 64, without appending additional authentication tags to the data 66 as it passes through the intermediate provider networks 18.

Figure 11:
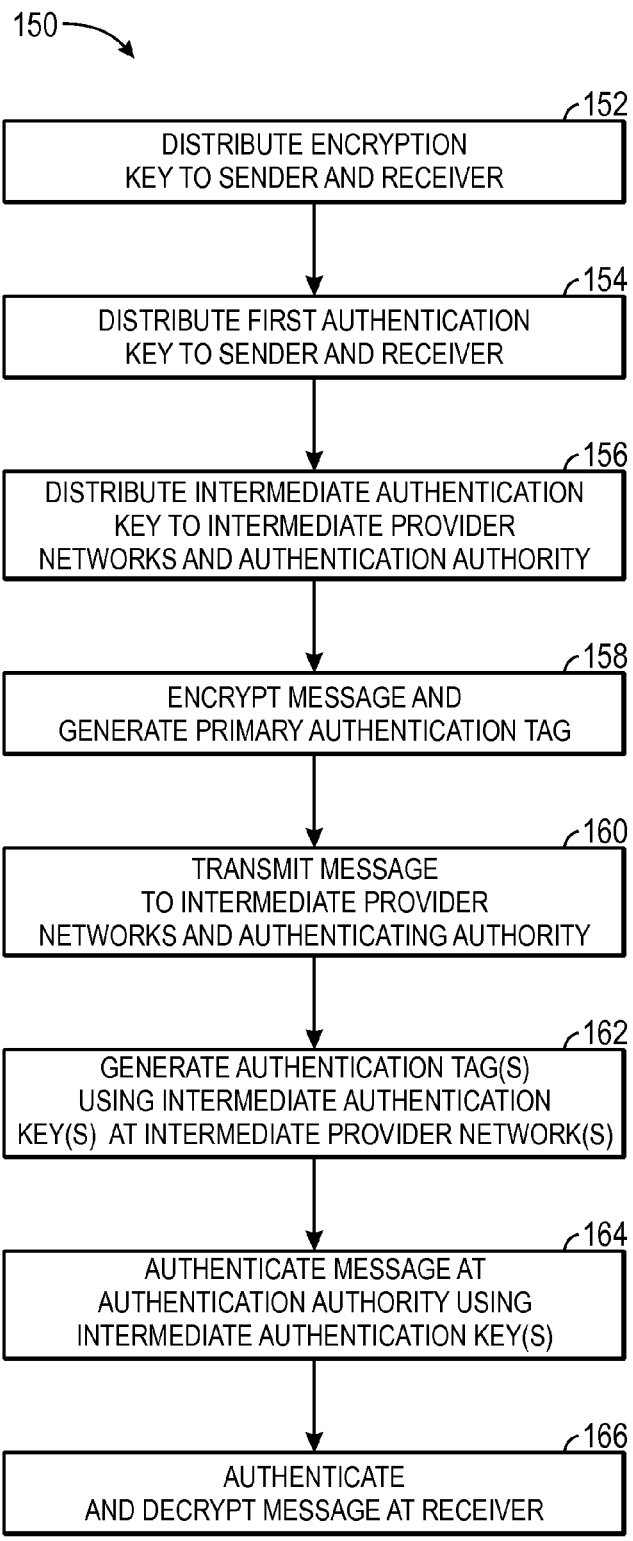
FIG. 11 is a flowchart of a method for detecting troublesome communication nodes using the system of FIG. 10, in accordance with an embodiment.

The system 120 of FIG. 10 may operate, for example, as shown by a flowchart 150 of FIG. 11. The encryption key E 62 may be distributed to the sender 12 and receiver 16, respectively, in any suitable manner (block 152). The encryption key E 62 may be distributed, for example, through any suitable form of public-private key encryption (e.g., Diffie-Hellman) or any other suitable key distribution techniques. For instance, the encryption key E 62 may be propagated between the sender 12 and the receiver 16 by sending the encryption key E 62 through a separate message from the sender 12 to the receiver 16 that is encrypted using a public-private key authentication scheme. Similarly, the authentication keys A1 64 may be distributed to the sender 12 and the receiver 16 (block 154). The authentication keys A1 64 also may be distributed, for example, through any suitable form of public-private key encryption or any other suitable key distribution techniques. The authentication keys A2 124, A3 126, and A4 128 may be distributed to the intermediate provider network(s) 18 and the authentication authority 122 in any suitable manner, such as a form of public-private key encryption (block 158). By way of example, in one embodiment, the authentication authority 122 may coordinate the distribution of the various public-authentication key pairs.

The sender 12 may encrypt the message 14 using the encryption key E 62 and digitally sign the message 14 using the encryption keys A1 64 (block 158) before transmitting the message 14 out toward the receiver 16 and to the authentication authority (block 160). To enable the authentication authority 122 to authenticate the message 14 as the message 14 travels through the intermediate provider networks 18, the sender 12 may send the message 14 either directly to the authentication authority 122 or via some other trusted network to the authentication authority 122. Thus, in some embodiments, the authentication authority 122 may be located within or in direct or near-direct communication with the sender 12 to ensure that the authentication authority 122 receives a genuine, unchanged copy of the message 14. Additionally or alternatively, the authentication authority may authenticate the message 14 using the end-to-end authentication keys A1 64 or some other authentication key to ensure that the authentication authority 122 receives a genuine, unchanged copy of the message 14.

The various communication nodes 20 of the intermediate provider networks 18 may generate the authentication tags 136, 138, and/or 140 and send them to the authentication authority 122 (block 162). In one example, this may take place at each communication node 20 using the authentication logic 42 and the particular authentication keys A2 124, A3 126, or A4 128. In another example, all or a subset of communication nodes 20 may periodically, randomly, or otherwise statistically sample messages 14 to generate the authentication tags 136, 138, and/or 140. Doing so may consume fewer resources than generating the authentication tags 136, 138, and/or 140 for every message 14 at every communication node 20. The intermediate provider networks 18 may send the authentication tags 136, 138, and/or 140 to the authentication authority 122 in any suitable way.

Because the authentication authority 122 holds a genuine copy of the message 14 and the authentication keys A2 124, A3 126, and A4 128, the authentication authority 122 can identify whether the authentication tags 136, 138, and/or 140 properly reflect the original message 14 sent by the sender 12 (block 164). If the message 14 has been tampered with by any troublesome communication nodes 20 of the intermediate provider network(s) 18, the authentication authority 122 can detect that the authentication tags 136, 138, and/or 140 do not match the expected values in relation to the copy of the message 14 held by the authentication authority. As such, the authentication authority 122 may verify the authenticity of the message 14 simply by receiving the authentication tags 136, 138, and/or 140 from the intermediate provider networks 18, which may consume less bandwidth than transmitting the entire message 14 to the authentication authority from the intermediate provider networks 18. When the message 14 has finished traversing the intermediate provider networks 18 and arrives at the receiver 16, the receiver 16 may decrypt the message 14 using the encryption key E 62 and authenticate the message using the authentication keys A1 64 (block 166).

Figure 12:
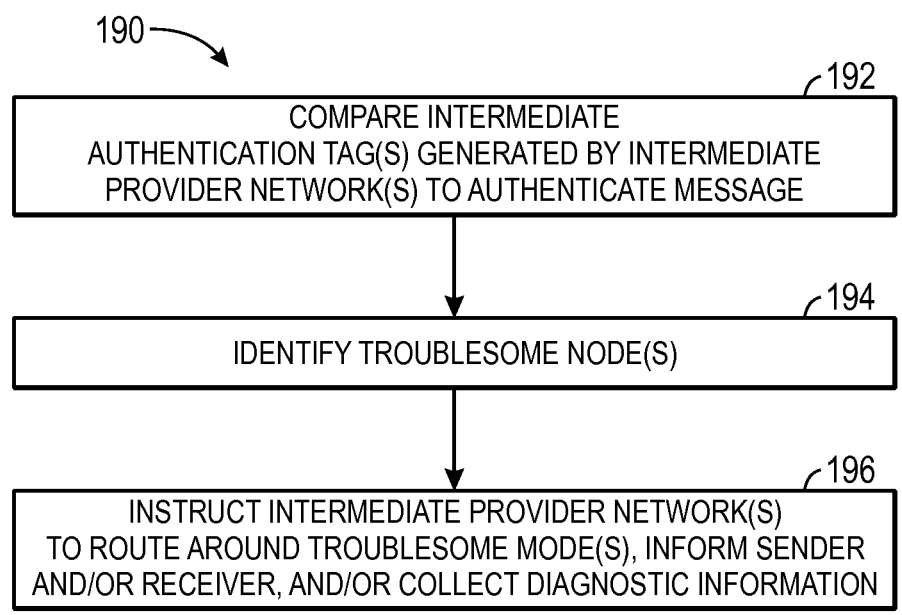
FIG. 12 is a flowchart of a method for responding to the detection of a troublesome communication node, in accordance with an embodiment.

Thus, as described by a flowchart 190 of FIG. 12, the message 14 may be authenticated at each communication node 20, some subset of the communication nodes 20, and/or according to some statistical sampling scheme of the communication nodes 20 by observing the authentication tags 136, 138, and/or 140 in the authentication authority 122 (block 192). Occasionally, the message 14 may be identified as not authentic, which may enable the authentication authority 122 to identify one or more troublesome communication node(s) 20 and/or troublesome intermediate provider network(s) 18 as having tampered with or otherwise corrupted the message 14 (block 194). The authentication authority 122 may use this information to cause remedial action. For example, the authentication authority 122 may instruct the intermediate provider network 18 to route around the troublesome communication node(s) 20 or otherwise inform the sender 12, receiver 16, and/or intermediate provider networks 18 of the troublesome communication node(s) 20 and/or troublesome intermediate provider network(s) 18 to enable them to take remedial action (block 196). By way of example, the sender 12 may modify the data 30 of the message 14 in an effort to conduct a diagnostic evaluation of the nature of the tampering and/or the intermediate provider network(s) 18 that are not compromised may avoid sending the message 14 through intermediate provider network(s) 18 that are compromised, and so forth. Additionally or alternatively, knowledge of a compromised or troublesome communication node 20 may be used to identify an underlying entity that may have caused the communication node 20 to become compromised.

While the embodiments set forth in the present disclosure may be susceptible to various modifications and alternative forms, specific embodiments have been shown by way of example in the drawings and have been described in detail herein. However, it should be understood that the disclosure is not intended to be limited to the particular forms disclosed. The disclosure is to cover all modifications, equivalents, and alternatives falling within the spirit and scope of the disclosure as defined by the following appended claims. Moreover, means-plus-function or step-plus-function construction is not intended unless a claim expressly recites "means for" or "step for" followed by a function. Recitations such as "configured to" or "programmed to" are intended to define the operation of claim elements without invoking means-plus-function or step-plus-function construction.

What is claimed is:

1. A method comprising:
passing a first copy of an electronic or optical message deriving from a sender and bound for a receiver through communication nodes of a switched-path network; and
when the first copy of the electronic or optical message passes through each of one or more of the communication nodes, using authentication logic of that communication node to:
generate a respective authentication tag based on the first copy of the electronic or optical message and an intermediate authentication key, wherein the respective authentication tag is configured to enable a third-party authentication authority to authenticate the first copy of the electronic or optical message to identify whether the first copy of the electronic or optical message has been tampered with or corrupted upon arrival at that communication node at least partially by:
receiving a second copy of the electronic or optical message from the sender;
generating a second authentication tag using the second copy of the electronic or optical message and the intermediate authentication key; and
comparing the respective authentication tag received from the communication node and the second authentication tag to identify whether the first copy of the electronic or optical message is authentic; and
identify, independently of the third-party authentication authority, whether the first copy of the electronic or optical message is authentic using an end-to-end authentication key, wherein the first copy of the electronic or optical message comprises an end-to-end authentication tag generated by the sender using the end-to-end authentication key.

2. The method of claim 1, wherein the switched-path network comprises an optical transport network (OTN).

3. The method of claim 1, wherein each of the one or more of the communication nodes authenticates the first copy of the electronic or optical message to identify whether the first copy of the electronic or optical message has been tampered with or corrupted upon arrival at that communication node using the end-to-end authentication key that is also configured to be used to authenticate the first copy of the electronic or optical message at the receiver.

4. The method of claim 1, wherein each of the one or more of the communication nodes authenticates the first copy of the electronic or optical message to identify whether the first copy of the electronic or optical message has been tampered with or corrupted upon arrival at that communication node using the intermediate authentication key.

5. The method of claim 1, wherein the one or more of the communication nodes comprises all of the communication nodes of the switched-path network.

6. The method of claim 1, wherein each of the one or more of the communication nodes is configured to generate respective authentication tags for every electronic or optical message passed through the switched-path network.

7. The method of claim 1, wherein each of the one or more of the communication nodes is configured to generate the respective authentication tag at a periodic, random, or statistical sampling interval of electronic or optical messages passed through the switched-path network.

8. The method of claim 1, comprising, using at least one of the one or more communication nodes or using the third-party authentication authority, or both, determining that a communication node prior to one of the one or more communication nodes is a troublesome communication node that has tampered with or corrupted the first copy of the electronic or optical message when the first copy of the electronic or optical message is identified as not authentic upon reaching the one of the one or more communication nodes.

9. The method of claim 8, comprising, using a control plane of the switched-path network, routing future messages around the troublesome communication node to prevent or reduce tampering with or corruption of future electronic or optical messages.

10. The method of claim 1, wherein the respective authentication tag is configured to enable the third-party authentication authority to identify whether the first copy of the electronic or optical message has been tampered with or corrupted upon arrival at that communication node at least partially by:
identifying whether the first copy of the electronic or optical message is authentic when the first copy of the electronic or optical message arrives at that communication node at least partially by:
receiving the respective authentication tag generated by that communication node;
identifying the first copy of the electronic or optical message as being authentic when the respective authentication tag matches the authentication tag; and
identifying the first copy of the electronic or optical message as not being authentic when the respective authentication tag does not match the second authentication tag.

11. The method of claim 1, wherein the authentication logic at least partially authenticates the first copy of the electronic or optical message to enable identification of whether the first copy of the electronic or optical message was tampered with or corrupted by a troublesome communication node that handled the first copy of the electronic or optical message prior to that communication node.

12. A system comprising:
an authentication authority that:
receives a first copy of an electronic or optical message from a sender;
generates a first authentication tag using the first copy of the electronic or optical message and a first authentication key; and
identifies whether a second copy of the electronic or optical message is authentic when the second copy of the electronic or optical message passes through one of a plurality of communication nodes of a first switched-path network at least partially by:
receiving a second authentication tag generated by the one of the plurality of communication nodes of the first switched-path network using the second copy of the electronic or optical message and the first authentication key;

comparing the first authentication tag and the second authentication tag;

identifying the second copy of the electronic or optical message as being authentic when the first authentication tag matches the second authentication tag; and identifying the second copy of the electronic or optical message as not being authentic when the first authentication tag does not match the second authentication tag; and the first switched-path network, wherein the first switched-path network comprises the plurality of communication nodes, wherein the one of the plurality of communication nodes:

generates the second authentication tag using the second copy of the electronic or optical message and the first authentication key;

sends the second authentication tag to the authentication authority to enable the authentication authority to identify whether the second copy of the electronic or optical message is authentic; and identifies, independently of the authentication authority, whether the second copy of the electronic or optical message is authentic using a second, end-to-end, authentication key, wherein the second copy of the electronic or optical message comprises an end-to-end authentication tag generated by the sender using the second, end-to-end, authentication key.

13. The system of claim 12, wherein the authentication authority:

generates a third authentication tag using the first copy of the electronic or optical message and a third authentication key; and identifies whether the second copy of the electronic or optical message is authentic when the second copy of the electronic or optical message passes through one of a plurality of communication nodes of a second switched-path network at least partially by:

receiving a fourth authentication tag generated by the one of the plurality of communication nodes of the second switched-path network using the second copy of the electronic or optical message and the third authentication key;

comparing the third authentication tag and the fourth authentication tag;

identifying the second copy of the electronic or optical message as being authentic when the third authentication tag matches the fourth authentication tag; and identifying the second copy of the electronic or optical message as not being authentic when the third authentication tag does not match the fourth authentication tag.

14. The system of claim 12, wherein the authentication authority determines that a communication node prior to the one of the plurality of communication nodes has tampered with the second copy of the electronic or optical message when the authentication authority identifies that the second copy of the electronic or optical message is not authentic when the second copy of the electronic or optical message passes through the one of the plurality of communication nodes of the first switched-path network.

15. The system of claim 12, wherein the authentication authority determines that a different switched-path network prior to the first switched-path network has tampered with the second copy of the electronic or optical message when the authentication authority identifies that the second copy of the electronic or optical message is not authentic when the second copy of the electronic or optical message passes through the one of the plurality of communication nodes of the first switched-path network.

16. The system of claim 12, wherein the authentication authority identifies whether the second copy of the electronic or optical message is authentic when the second copy of the electronic or optical message passes through all of the plurality of communication nodes of the first switched-path network in the same manner as when the second copy of the electronic or optical message passes through the one of the plurality of communication nodes of the first switched-path network.

17. The system of claim 12, wherein the authentication authority receives the first copy of the electronic or optical message directly from the sender to ensure that the first copy of the electronic or optical message is a genuine copy of the electronic or optical message.

18. The system of claim 12, wherein the authentication authority, after receiving the first copy of the electronic or optical message but before generating the first authentication tag, verifies that the first copy of the electronic or optical message is a genuine copy of the electronic or optical message by authenticating the first copy of the electronic or optical message using the second, end-to-end, authentication key, wherein the first copy of the electronic or optical message comprises an end-to-end authentication tag generated by the sender using the second, end-to-end, authentication key.

19. The system of claim 12, wherein the authentication authority at least partially authenticates the second copy of the electronic or optical message to enable identification of whether the second copy of the electronic or optical message was tampered with or corrupted by a troublesome communication node that handled the second copy of the electronic or optical message prior to the one of the plurality of communication nodes.

20. The system of claim 12, wherein the second authentication tag is configured to enable the authentication authority to authenticate the second copy of the electronic or optical message to identify whether the second copy of the electronic or optical message has been tampered with or corrupted upon arrival at that communication node.

21. An optical transport network comprising:

a plurality of switched-path optical communication nodes that pass a first copy of an electronic or optical message routed in a switched path through the plurality of switched-path optical communication nodes, wherein at least one of the plurality of switched-path optical communication nodes comprises authentication logic to at least partially authenticate the first copy of the electronic or optical message to enable identification of whether the first copy of the electronic or optical message was tampered with or corrupted by a troublesome communication node that handled the first copy of the electronic or optical message prior to the at least one of the plurality of switched-path optical communication nodes at least partially by:

authenticating the first copy of the electronic or optical message itself using a first authentication key also used for end-to-end authentication of the first copy of the electronic or optical message by an end receiver of the first copy of the electronic or optical message; and enabling a third-party authentication authority to authenticate the first copy of the electronic or optical message at least partially by:

generating an authentication tag using the first copy of the electronic or optical message and a second authentication key also held by the third-party authentication authority; and sending the authentication tag to the third-party authentication authority to enable the third-party authentication authority to identify whether the first copy of the electronic or optical message is authentic at least partially by comparing the authentication tag to a second authentication tag generated by the third-party authentication authority using the second authentication key and a second copy of the electronic or optical message.

22. The optical transport network of claim 21, wherein the authentication logic of the at least one of the plurality of switched-path optical communication nodes at least partially authenticates the electronic or optical message by:

authenticating the electronic or optical message itself using the second authentication key not used for end-to-end authentication of the electronic or optical message;

authenticating the electronic or optical message itself using the first authentication key and the second authentication key; or any combination thereof.

23. The optical transport network of claim 21, wherein:

the authentication logic enables the third-party authentication authority to authenticate the first copy of the electronic or optical message at least partially by:

receiving the first copy of the electronic or optical message from a sender; and the third-party authentication authority identifies whether the first copy of the electronic or optical message is authentic at least partially by:

receiving the second copy of the electronic or optical message from the sender;

receiving the authentication tag from the at least one of the plurality of switched-path optical communication nodes;

identifying the first copy of the electronic or optical message as being authentic when the authentication tag matches the second authentication tag; and identifying the first copy of the electronic or optical message as not being authentic when the authentication tag does not match the second authentication tag.

24. The optical transport network of claim 21, wherein the authentication tag is configured to enable the third-party authentication authority to authenticate the first copy of the electronic or optical message to identify whether the first copy of the electronic or optical message has been tampered with or corrupted upon arrival at the at least one of the plurality of switched-path optical communication nodes.

25. An electronic device comprising:

network interface circuitry to enable the electronic device to operate as a communication node in a switched-path network by receiving and forwarding a first copy of an electronic or optical message through the switched-path network; and authentication logic, wherein the authentication logic is tangibly embodied on a non-transitory computer-readable medium that is executed on a processor of the electronic device or programmed onto an integrated circuit, or both, and wherein the authentication logic:

generates an authentication tag based on the first copy of the electronic or optical message and an intermediate authentication key, wherein the authentication tag provides sufficient information to enable a third-party authentication authority to authenticate the first copy of the electronic or optical message to identify whether the first copy of the electronic or optical message has been tampered with or corrupted upon receipt at the electronic device at least partially by:

receiving a second copy of the electronic or optical message from a sender of the electronic or optical message;

generating a second authentication tag using the second copy of the electronic or optical message and the intermediate authentication key; and comparing the authentication tag received from the electronic device and the second authentication tag to identify whether the first copy of the electronic or optical message is authentic; and identifies, independently of the third-party authentication authority, whether the first copy of the electronic or optical message is authentic using an end-to-end authentication key, wherein the first copy of the electronic or optical message comprises an end-to-end authentication tag generated by the sender using the end-to-end authentication key.

26. The electronic device of claim 25, wherein the network interface circuitry comprises an optical receiver, an optical transmitter, or both, to enable the electronic device to operate as the communication node in the switched-path network, wherein the switched-path network comprises an optical transport network (OTN).

27. The electronic device of claim 25, wherein the authentication logic authenticates the electronic or optical message using:

the end-to-end authentication key that is also used to authenticate the first copy of the electronic or optical message when the first copy of the electronic or optical message reaches a destination beyond the switched-path network; or a second authentication key used in addition to the end-to-end authentication key; or both.

28. The electronic device of claim 25, wherein the authentication tag provides sufficient information to enable the third-party authentication authority to authenticate the first copy of the electronic or optical message to identify whether the first copy of the electronic or optical message has been tampered with or corrupted upon receipt at the electronic device at least partially by:

identifying whether the first copy of the electronic or optical message is authentic when the first copy of the electronic or optical message arrives at the electronic device at least partially by:

receiving the authentication tag from the electronic device;

identifying the first copy of the electronic or optical message as being authentic when the authentication tag matches the second authentication tag; and identifying the first copy of the electronic or optical message as not being authentic when the authentication tag does not match the second authentication tag.

29. The electronic device of claim 25, wherein the authentication logic at least partially authenticates the first copy of the electronic or optical message to enable identification of whether the first copy of the electronic or optical message was tampered with or corrupted by a troublesome communication node that handled the first copy of the electronic or optical message prior to the electronic device.

30. An integrated circuit programmed with authentication logic for intermediate authentication of a first copy of an electronic or optical message passing through a communication node along a switched path in a switched-path network, comprising:

logic to generate an authentication tag based on the first copy of the electronic or optical message and an intermediate authentication key, wherein the authentication tag provides sufficient information to a third-party authentication authority to authenticate the first copy of the electronic or optical message to identify whether the first copy of the electronic or optical message has been tampered with or corrupted upon receipt at the communication node at least partially by:

receiving a second copy of the electronic or optical message from a sender of the electronic or optical message;

generating a second authentication tag using the second copy of the electronic or optical message and the intermediate authentication key; and comparing the authentication tag and the second authentication tag to identify whether the first copy of the electronic or optical message is authentic; and logic to identify, independently of the third-party authentication authority, whether the first copy of the electronic or optical message is authentic using an end-to-end authentication key, wherein the first copy of the electronic or optical message comprises an end-to-end authentication tag generated by the sender using the end-to-end authentication key.

31. The integrated circuit of claim 30, wherein the integrated circuit comprises a programmable logic device and the authentication logic comprises data utilization circuitry of the programmable logic device that has been programmed to include the authentication logic.

32. The integrated circuit of claim 30, wherein the integrated circuit comprises an application-specific integrated circuit (ASIC).

33. The integrated circuit of claim 30, wherein the authentication tag provides sufficient information to the third-party authentication authority to authenticate the first copy of the electronic or optical message to identify whether the first copy of the electronic or optical message has been tampered with or corrupted upon receipt at the communication node at least partially by:

identifying whether the first copy of the electronic or optical message is authentic when the first copy of the electronic or optical message arrives at the communication node at least partially by:

receiving the authentication tag from communication node;

comparing the authentication tag and the second authentication tag;

identifying the first copy of the electronic or optical message as being authentic when the authentication tag matches the second authentication tag; and identifying the first copy of the electronic or optical message as not being authentic when the authentication tag does not match the second authentication tag.

34. The integrated circuit of claim 30, wherein the authentication logic comprises logic for at least partially authenticating the first copy of the electronic or optical message to enable identification of whether the first copy of the electronic or optical message was tampered with or corrupted by a troublesome communication node that handled the first copy of the electronic or optical message prior to the communication node.

\* \* \* \* \*